May 19, 1942.  P. E. FRETTEM  2,283,430
FLASHLIGHT
Filed July 21, 1941    2 Sheets-Sheet 1
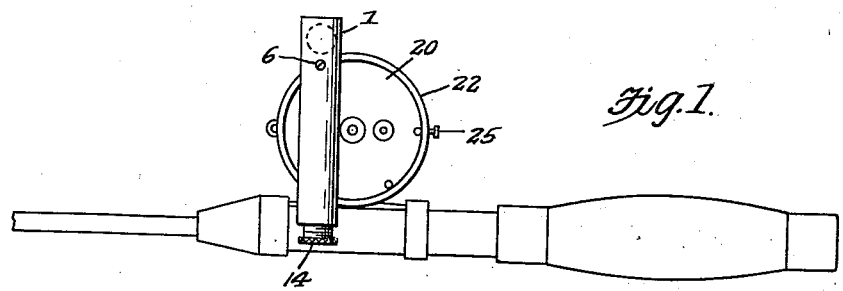
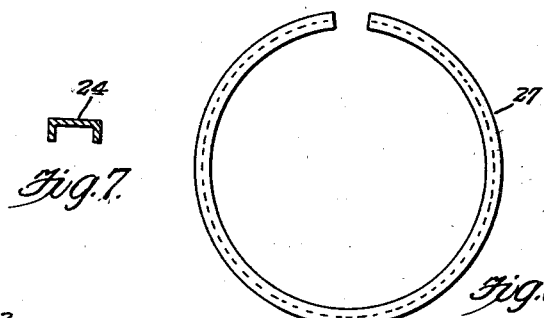
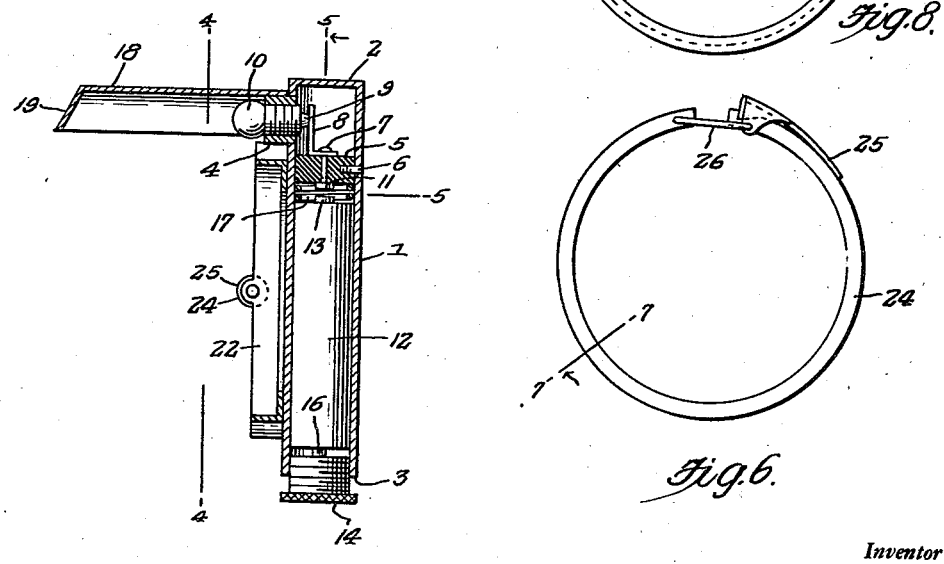
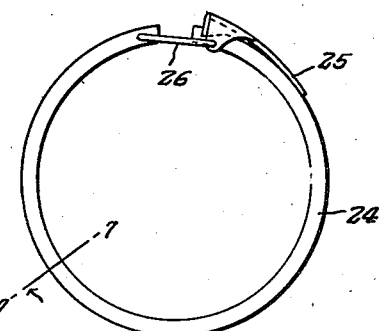
Inventor
Palmer E. Frettem,
By Clarence A. O'Brien
Attorney May 19, 1942.  P. E. FRETTEM  2,283,430
FLASHLIGHT
Filed July 21, 1941  2 Sheets-Sheet 2
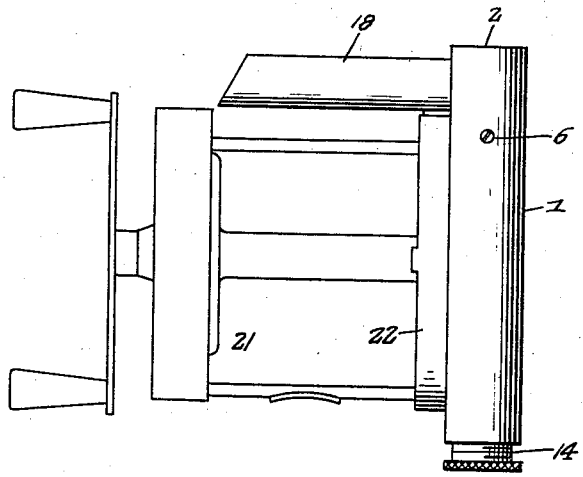
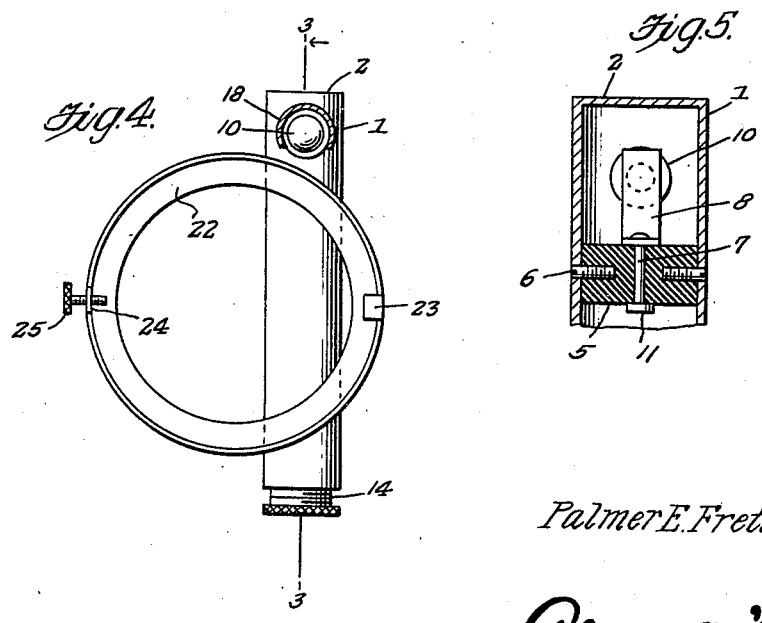
Inventor
Palmer E. Frettem.
By Clarence A. O'Brien
Attorney Patented May 19, 1942

2,283,430

UNITED STATES PATENT OFFICE 2,283,430

FLASHLIGHT

Palmer E. Frettem, Estherville, Iowa

Application July 21, 1941, Serial No. 403,424

5 Claims. (Cl. 240—6.4)

My invention relates to improvements in flash lights, the principal object in view being to provide a simply constructed, inexpensive and practical device of this character equipped for quick and easy attachment to reels of fishing rods for use in night fishing, and which is adapted for deflecting the light at various angles to facilitate fishing or for other purposes.

Another object is to provide a device of the character and for the purposes above set forth which may be attached to different sizes of reels.

Other and subordinate objects are also comprehended by my invention, all of which, together with the precise nature of my improvement, will be readily understood when the succeeding description and claims are read with reference to the drawings accompanying and forming part of this specification.

In said drawings—

Figure 1 is a view in side elevation of the preferred embodiment of my invention applied to the reel of a fishing rod.

Figure 2 is a view in front elevation, drawn to an enlarged scale, the reed being detached.

Figure 3 is a view in longitudinal vertical section taken on the line 3—3 of Figure 4.

Figure 4 is a view in elevation, with parts shown in section, of the flash light detached.

Figure 5 is a view in vertical section taken on the line 5—5 of Figure 3 and drawn to an enlarged scale.

Figure 6 is a view in side elevation of a modification of the invention.

Figure 7 is a view in transverse section taken on the line 7—7 of Figure 6.

Figure 8 is a view in side elevation of another modification of the invention.

Referring to the drawings by numerals, and first to Figures 1 to 5 thereof, according to my invention, in its preferred embodiment, a flash light is provided comprising a cylindrical casing 1 of any suitable, conductive metal and size, and having a closed front end 2, an open rear end 3 internally threaded, and a radial, tubular, internally threaded bulb socket 4 adjacent the closed end 2.

A disk-like plug 5 of insulation is fitted in the casing 1, adjacent the socket 4, between the latter and the rear end 3, and which is secured therein by a set screw 6 threaded radially into the casing 1.

An axial, headed stud 7 of conductive material extends through the plug 5 and secures thereto a right angled plate-like conductor 8 adapted to bear at one end against the usual terminal 9 of an electric light bulb 10 threaded into the socket 4. The stud 7 is provided with an enlarged contact button 11 facing the rear end of the casing 1.

A dry cell 12 is slidably mounted in the casing 1 with one end terminal 13 opposed to the contact button 11.

A threaded closure plug 14, of conductive material, is turned into the rear end of the casing 1, said plug having an enlarged outer end head 15 for turning the same, and an axial stud 16 on its inner end engaging the other end terminal, not shown, of the cell 12.

A coil spring 17 is interposed between the plug 5 and the cell 12 and urges the cell away from the plug 5 to space the terminal 13 from the contact button 11.

A reflector shade is provided in the form of a longitudinally slotted tube 18 having an oblique outer end 19, and an open inner end frictionally fitting around the socket 4 so that said shade extends endwise from the socket 4 and is rotatable on the socket into different set positions.

Means are provided for mounting the described light on, preferably, the left hand end disk 20 of a fishing reel 21 comprising, preferably, an annular frame 22 of right angled form transversely fitting loosely over and against said disk 20. An inwardly extending, radial keeper lug 23 is provided on the rim edge of the frame 22 for engaging the rear face of the disk 20 to retain the frame thereon at one side thereof. An outturned lug 24 is provided on said edge of the frame 22 diametrically opposite the lug 23, said lug 24 having a set screw 25 threaded therethrough for turning inwardly of the frame 22 alongside the rear face of the disk 20 to retain the frame on the disk at said opposite side of the frame 22.

The casing 1 is fixed to the outer face of the frame 22 to extend crosswise thereof, as by soldering, not shown, said casing 1 being laterally offset to one side of the center of the frame so that when said frame is applied, as previously described, said casing may be disposed forwardly of the axis of the reel 21 in substantially upright position and with the light bulb 10 and shade 18 extending over the reel 21 lengthwise thereof, it being understood that the casing 1 is of suitable length to extend across and beyond the disk 20 of said reel 21 and that the frame 22 is on the same side of the casing 1 as the bulb 10 and shade 18.

The manner in which the described flash light is operated will be apparent. By turning the plug 14 into the casing 1, the cell 12 is slid inwardly of the casing, in opposition to the tension exerted by the spring 17, to engage the terminal 13 with the button 11. In this position of the parts, the current from the cell 12 passes to the terminal 9 of the bulb 10 by way of stud 7 and conductor 8 and back to the cell 12 by way of casing 1, plug 14 and stud 16. By rotating the frame 22 on the disk 20, the bulb 10 may be shifted around the reel 21, as desired, and by rotating the shade, or tube, 18 on the socket 4, the beam of light may be deflected forwardly, or rearwardly, of the reel 21, or upwardly or downwardly, or into any other direction desired.

In the modification of the invention shown in Figures 6 and 7, a split ring type, resilient frame 24 of internally channeled form is provided for use in lieu of the frame 22 and which is adapted to be clamped around the end disk 20 of the reel 21 by means of a suitable lever 25 pivoted on one end thereof and operatively connected to a link 26 pivoted to the other end of said frame, the arrangement being such that by swinging the lever 25 toward the frame 24, the ends of the latter may be drawn together to clamp the frame in position.

In the modification shown in Figure 8, a resilient, split ring frame 27, similar to frame 24 is provided for use without the lever 25 and link 26. In this form of mounting for the flash light, the frame 27 reacts to clamp the disk 20 of the reel 21 and is particularly adapted for attachment to reels of different sizes as will be clear.

The foregoing will, it is believed, suffice to impart a clear understanding of my invention without further explanation.

Manifestly the invention is susceptible of modification in other respects and as herein set forth, and right is herein reserved to such other modifications falling fairly within the scope of the subjoined claims.

Having described the invention, what is claimed as new is:

1. A flash light for attachment to the end of a reel on a fishing rod or the like, comprising a cylindrical casing for storage batteries, a light bulb socket extending radially from said casing adjacent one end thereof, a light bulb extending from said socket, an elongated shade extending endwise from said socket and mounted thereon, and means to mount said casing on said end of the reel to extend alongside said end with the shade extending lengthwise over said reel parallel therewith.

2. A flash light for attachment to the end of a reel on a fishing rod or the like, comprising a cylindrical casing for storage batteries, a light bulb socket extending radially from said casing adjacent one end thereof, a light bulb extending from said socket, an elongated shade extending endwise from said socket and mounted thereon, and means to mount said casing on said end of the reel to extend alongside said end with the shade extending lengthwise over said reel parallel therewith, said shade being rotatable on said socket to deflect the light from said bulb.

3. A flash light for attachment to the end of a reel on a fishing rod or the like, comprising a cylindrical casing for storage batteries, a light bulb socket extending radially from said casing adjacent one end thereof, a light bulb extending from said socket, an elongated shade extending endwise from said socket and mounted thereon, and means to mount said casing on said end of the reel to extend alongside said end with the shade extending lengthwise over said reel parallel therewith, said means comprising a member rotatable on said end of the reel to revolve said bulb about said reel.

4. A flash light for attachment to the end of a reel on a fishing rod or the like, comprising a cylindrical casing for storage batteries, a light bulb socket extending radially from said casing adjacent one end thereof, a light bulb extending from said socket, an elongated shade extending endwise from said socket and mounted thereon, and means to mount said casing on said end of the reel to extend alongside said end with the shade extending lengthwise over said reel parallel therewith, said means comprising an annulus fitting over and against said end and rotatable thereon into different angular positions to revolve the light bulb about said reel.

5. A flash light for attachment to the end of a reel on a fishing rod or the like, comprising a cylindrical casing for storage batteries, a light bulb socket extending radially from said casing adjacent one end thereof, a light bulb extending from said socket, an elongated shade extending endwise from said socket and mounted thereon, and means to mount said casing on said end of the reel to extend alongside said end with the shade extending lengthwise over said reel parallel therewith, said means comprising an annulus fitting over and against said end and rotatable thereon into different angular positions to revolve the light bulb about said reel, said casing being secured to one side of said annulus to extend crosswise thereof for location alongside said end, and offset from the axis of the annulus to dispose the same and the light bulb forwardly of the center of the reel.

PALMER E. FRETTEM.